United States Patent [19]

Klotz et al.

[11] 4,439,292

[45] Mar. 27, 1984

[54] TREATMENT OF PERFLUORINATED POLYMER MEMBRANES CONTAINING CARBOXYL GROUPS

[75] Inventors: Helmut Klotz, Bergisch-Gladbach; Hans G. Fitzky, Odenthal, both of Fed. Rep. of Germany

[73] Assignee: Bayer Aktiengesellschaft, Leverkusen, Fed. Rep. of Germany

[21] Appl. No.: 401,757

[22] Filed: Jul. 26, 1982

[30] Foreign Application Priority Data

Aug. 13, 1981 [DE] Fed. Rep. of Germany ....... 3131978
May 3, 1982 [DE] Fed. Rep. of Germany ....... 3216417

[51] Int. Cl.³ .......................... C08F 2/54; C25C 7/09
[52] U.S. Cl. ..................................... 204/165; 204/168; 204/296
[58] Field of Search ................ 204/165, 168, 169, 296

[56] References Cited

U.S. PATENT DOCUMENTS

| 3,291,712 | 12/1976 | McBride | 204/165 |
| 4,072,769 | 2/1978 | Lidel | 204/165 |
| 4,100,113 | 7/1978 | McCain | 204/165 |
| 4,264,750 | 4/1981 | Anand et al. | 204/169 |

FOREIGN PATENT DOCUMENTS 2442209 3/1975 Fed. Rep. of Germany .
3016339 11/1980 Fed. Rep. of Germany .

OTHER PUBLICATIONS

Chemical Abstracts, vol. 86, 1977, p. 6001.

*Primary Examiner*—R. L. Andrews
*Assistant Examiner*—Terryence Chapman
*Attorney, Agent, or Firm*—Sprung, Horn, Kramer & Woods

[57] ABSTRACT

In the treatment of a perfluorinated polymer membrane containing acid ion exchanger groups in a corona discharge, the improvement which comprises employing a membrane containing carboxyl groups and maintaining the membrane at a temperature below about 80° C. during the discharge treatment. Advantageously the corona discharge treatment is carried out intermittently, the temperature is maintained at about $-10°$ to $+22°$ C., during the treatment the average rate of irradiation is below about 2 Ah/m², the frequency of the corona discharge is from about 5 to 15 kHz, the voltage for producing the corona discharge is from about 1 to 20 kV and the dose is from about 0.1 to 10 Ah/m² of membrane surface. The resulting membranes exhibit lowered resistance resulting in lower cell voltages when used in the electrolysis of sodium chloride.

10 Claims, 2 Drawing Figures

TREATMENT OF PERFLUORINATED POLYMER MEMBRANES CONTAINING CARBOXYL GROUPS

The membrane process for the preparation of chlorine, sodium hydroxide and hydrogen by the electrolysis of sodium chloride sols has undergone extremely rapid development in recent years (see H. Hund and F. R. Minz, Chlor, Alkalien und anorganische Chlorverbindungen in "Chemische Technologie" by Winacker, Küchler, Volume 2, Anorganische Technologie I, in particular pages 410 et seq (1982)). Perfluorinated polymer membranes containing carboxyl groups as acid exchanger groups have become particularly important in this connection. Since membranes with sufficient sol resistance are available, the attempts in the development of membranes have been aimed in particular in the direction of lowering the specific energy consumption per ton of chlorine or sodium hydroxide.

The specific energy consumption is determined in particular (at a given current density) by the ratio of current yield and cell voltage in electrolysis. Part of the cell voltage drops across the membrane itself. The current yield indicates what percentage of the current which has passed through the electrolytic cell has led to the formation of sodium hydroxide. The remaining quantity of current which has passed through the cell has resulted in unwanted electrolytic side reactions.

The preparation of perfluorinated polymer membranes containing carboxyl groups is known. Such methods of preparation have been described, for example in German Offenlegungsschrift Nos. 2,630,584; 2,746,416 and 2,822,493.

The present invention relates to a new process for the treatment of such membranes in a corona discharge.

"Corona discharge" is understood in the art to mean a certain form of gas discharge. For a definition, see Drost, "Plasmachemie", pages 66 et seq (1978).

The treatment of foils in corona discharges is known. It is used, for example, to solve problems of adhesion, to render a substance capable of being glued, and for printing, lacquering or laminating organic foils.

The treatment in a corona discharge of perfluorinated, ion exchanging polymer membranes for alkali metal chloride electrolysis has been proposed in Japanese Patent Specification No. 20 980/77. According to this state of the art, the treatment is to be carried out at from 130° to 200° C., preferably at a corona frequency of from 300° to 500° KHz. This is said to result in an improvement in the current yield although according to the present state of the art this is accompanied by an increase in the membrane resistance, i.e. an increase in the cell voltage.

Corona discharge treatment as employed according to the state of the art is also said to be effective for any ion exchanger groups and in particular for perfluorinated polymer membranes containing only sulphonic acid groups.

It has now been found that in the corona treatment of perfluorinated polymer membranes containing carboxyl groups as ion exchanging groups, the membrane temperature is of decisive importance.

The present invention therefore relates to a process for the treatment of perfluorinated polymer membranes containing carboxyl groups as acid exchanger groups in a corona discharge, which is characterized that the membrane is maintained at a temperature below 80° C. during the discharge treatment. The temperature should preferably be from $-20°$ to $-50°$ C., most preferably from $-10°$ to $+22°$ C. during the treatment.

In alkali metal chloride electrolysis, the membrane resistance is lowered to such an extent by the corona treatment according to the present invention that, when the electrolytic current density is 2 KA/m$^2$, the cell voltage is lowered by more than 300 millivolt.

The water content of the membrane is virtually unchanged by the corona treatment at relatively low temperatures, with the result that the dimensional stability of the membrane is improved, the cell voltages of the membranes remain more constant over a longer period of electrolysis and the service life in the electrolytic cell is increased. The current yield is not altered by the treatment according to the present invention. The specific energy consumption in the electrolytic cell is thus reduced by about 10% or more.

The corona discharge treatment itself may be carried out in known manner.

Figure 1:
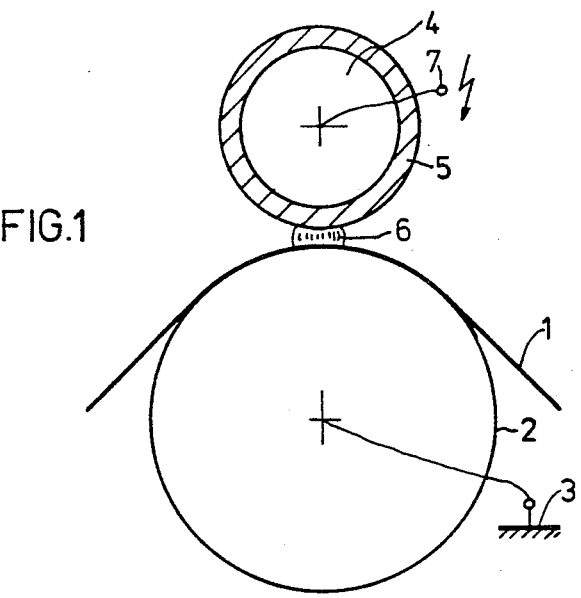
FIGS. 1 and 2 show an apparatus carrying out the process of the instant invention.
Figure 2:
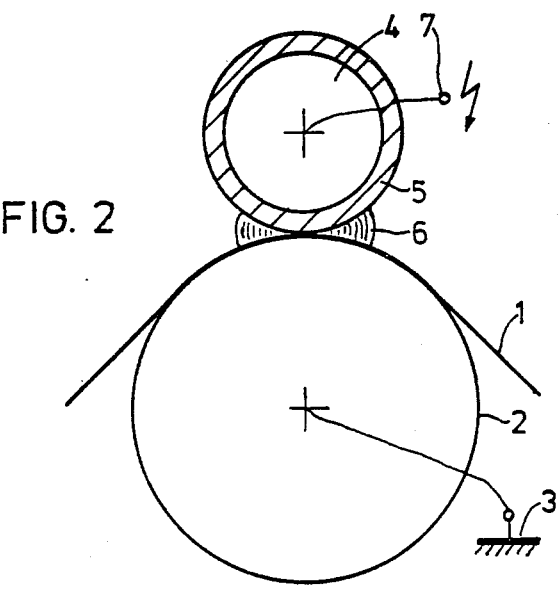

The invention will be further described with reference to the drawings wherein the figures show an apparatus for carrying out the process according to the present invention. Referring now more particularly to the drawings, a membrane 1 is transported over the grounded roller 2. The grounding is indicated at 3. A corona roller 4 is at high voltage generated by an alternating voltage generator (not shown). In order to avoid single discharges of high current intensity in favor of a large number of low intensity single discharges, the corona roller 4 is preferably insulated by a dielectric material 5. The dielectric material used may be Teflon polymer, for example; quartz glass is particularly preferred. A corona discharge 6 burns in the gap between the corona roller 4 and the grounded roller. The gap between membrane 1 and corona roller 4 is preferably adjusted to from 0.5 to 1 mm for the purpose of obtaining finely structured corona discharge.

The intensity of the corona discharge 6, which is regulated by adjusting the output of the generator, determines the extent to which the membrane is heated during the corona treatment.

The dose of irradiation during corona discharge is advantageously from 0.1 to 10 Ah/m$^2$ of membrane surface, preferably more than 0.5 Ah/m$^2$, most preferably from 2 to 5 Ah/m$^2$. Lower doses of irradiation have been found to be less effective. Higher doses are possible in principle, but do not provide further improvement in the membrane. Higher doses have not been found to have a damaging effect.

The important feature is the observance of the temperature according to the present invention.

In order that the temperature of the membrane may be maintained within the range according to the present invention during the corona discharge treatment, specialized measures for removing the heat are necessary. Exactly what measures are employed is not particularly critical and the measures are chosen according to the suitability thereof for the particular apparatus and may consist, for example, of blowing a stream of air through the discharge zone. If lower membrane temperatures or higher discharge intensities are desired, it may be suitable to employ a cooled air stream or carbon dioxide stream, and it is also possible to provide the grounded roller 2 with liquid cooling.

In general, however, it is difficult to keep the temperature of the membrane during corona treatment sufficiently low by cooling alone since the corona intensity in commercially available corona discharge apparatus generally cannot be adjusted below a certain level without the discharge becoming non-homogeneous. If the intensity is too high, i.e. if the rate of irradiation is too high, the heat produced cannot be removed sufficiently rapidly, particularly since the membrane itself is a good thermal insulator. Finely structured corona discharges require current densities of from 5 to 50 A/m² at atmospheric pressure (air). Irradiation intensities of this level result in intense heating of the membrane within a few seconds, which may hardly be countered even by very elaborate cooling.

According to the present invention, corona discharge is therefore carried out at intervals and cooling may easily be effected between these irradiation intervals. The lengths of the individual irradiation intervals and the pauses between them are preferably chosen to result in an average irradiation rate below 5 A/m². It is particularly preferred to employ an average irradiation rate not exceeding 2 A/m² since at such low rates the effort of cooling may also be kept low. There is, of course, no lower limit to the level to which the average irradiation rate may be reduced, but if it is very low it entails an undesirably long treatment time.

The intermittent corona discharge treatment is advantageously carried out by passing the membrane at a relatively high speed through a plurality of corona discharges arranged one behind the other. It is particularly preferred to carry out the treatment by attaching a finite length of membrane equal to the circumference of the metal roller 2 over the circumference of this roller and rotating the roller at a speed of, for example, 1 rev/sec. The membrane is then passed once per second through the discharge zone and the treatment time may be from 1/20 to 1/50 of a second. It is advantageous also to blow a stream of gas through the discharge zone. The total dose required for treatment is then obtained after, for example, from 1000 to 5000 individual doses. If efficient cooling of the membrane is required during the phases of rest between irradiation, several corona rollers 4 may be distributed over the circumference of the metal roller 2 so that several individual doses are given during one revolution of the metal roller 2.

The frequency of the corona discharge is relatively uncritical for the process according to the present invention. Very high frequencies have the disadvantage of requiring the use of high voltage generators with transmitter tubes. It is therefore preferred according to the present invention to use frequencies below 60 KHz, for which high voltage generators with semi-conductor elements (thyristors) are available. Frequencies of from 1 to 30 KHz, especially from 10 to 20 KHz, are particularly preferred.

Membranes which have been treated according to the present invention may be used in the conventional manner for alkali metal chloride electrolysis (optionally after further pre-treatment).

The irradiated side of the membrane, i.e. the side facing the corona roller 4, should preferably be used as the cathode side in the electrolytic cell.

The present invention will now be described with the aid of examples without thereby limiting its general applicability.

EXAMPLE 1

A commercially available perfluorinated polymer membrane of the Nafion 324 type of Dupont (Nafion is a Trade Mark of Dupont) containing sulphonic acid exchanger groups was substituted on the catholyte side corresponding to Example 28 of DE-A No. 2,630,584 by replacement of the sulphonic acid groups by carboxyl groups. The percentage content of carboxyl groups decreases with increasing distance from the catholyte surface in the direction towards the anolyte surface.

The resulting membrane containing carboxyl groups was cut into two parts A and B. One part (A) of the membrane was left untreated. The other part (B) was subjected to a corona treatment in an apparatus according to the drawing. For this treatment, the membrane was fixed over the circumference of the roller 2 with the catholyte side of the membrane facing the roller 4. The corona discharge was carried out in air with approximately 50% relative humidity (room temperature) at a frequency of 150 KHz and a voltage of 5 kV. The roller was rotated at 1 rev/sec so that it was intermittently irradiated, once per second, until the total dose amounted to 3.8 Ah/m² The temperature of the membrane was never higher than 80° C. throughout the treatment.

The two parts of the membrane were then installed in identical experimental electrolytic cells operated in parallel.

The anolyte used was purest NaCl sol at a conentration of approximately 314 g of NaCl per liter of sol. The cell temperature was 80° C. The catholyte concentration was adjusted to approximately 20% NaOH. A high current density was chosen for all experiments, namely 3.1 kA/m².

Values determined for cell voltage, current yield and specific energy consumption during electrolysis are entered in Table 1.

EXAMPLE 2

A commercially available perfluorinated polymer membrane containing sulphonic acid exchanger groups was modified as in Example 1 by replacement of the sulphonic acid groups by carboxylic acid groups.

An experimental electrolytic cell was operated with the membrane for 14 days under the conditions of Example 1. The results obtained are entered as Example 2A in the Table below.

The membrane was then removed from the cell, subjected to a corona discharge treatment as in Example 1 and again installed in the experimental electrolytic cell.

With the experimental conditions otherwise the same, the results obtained are entered under Example 2B in Table 1.

TABLE 1

| Example No. | Treatment in corona | Current density kA/m² | Cell voltage (Volt) | Current yield (%) | Specific energy consumption (kWh/t NaOH) |
|---|---|---|---|---|---|
| 1A | no | 3.1 | 4.11 Δ (mV) 320 | 99.2 | 2781 |
| 1B | yes | 3.1 | 3.79 | 97.0 | 2622 |
| 2A | no | 3.1 | 4.09 290 | 98.0 | 2801 |
| 2B | yes | 3.1 | 3.80 | 97.0 | 2629 |
| 3A | no | 2 | 3.50 | 92.3 | 2545 |

TABLE 1-continued

| Example No. | Treatment in corona | Current density kA/m² | Cell voltage (Volt) | Current yield (%) | Specific energy consumption (kWh/t NaOH) |
|---|---|---|---|---|---|
| 3B | yes | 2 | 300 3.20 | 93.1 | 2307 |
| 4A | no | 2 | 3.48 | 93.0 | 2511 |
| 4B | yes | 2 | 310 3.17 | 92.5 | 2300 |

EXAMPLE 3

A commercially available hydrolyzed membrane of the Flemion HB type (Flemion is a Trade Mark of Asahi Glass) measuring 0.20×0.20 m² was placed over a metal roller 58 mm in diameter and 200 mm in length. The corona roller had a diameter of 15 mm and was covered with a quartz jacket 1.5 mm in thickness (see drawing). The metal roller rotated at 1 rev/sec. It was treated with a discharge current of 25 mA for 3 hours. The total dose of the treatment amounted to $$\frac{3 \text{ h} \cdot 0.025 \text{ A}}{0.04 \text{ m}^2} = 1.86 \text{ Ah/m}^2$$

The membrane temperature was maintained at 25° C.±5° C. with the aid of an air current. The surface temperature was measured with a Raynger II infra-red measuring instrument and cooling was regulated accordingly. The corona frequency was 10 kHz.

This membrane was introduced into an electrolytic cell for the preparation of chlorine, hydrogen and sodium hydroxide and the voltage drop between anode and cathode was compared with that obtained with a membrane which had not been pretreated, but was otherwise similar. The distance between an activated titanium anode and a refined steel cathode was 3 mm. The anolyte used was purest NaCl sol at a concentration of approximately 290 g of NaCl/liter of sol. The cell temperature was from 85° to 89° C. and the concentration of the lye was regulated to from 33 to 38% NaOH.

Two membrane cells electrically connected in series were operated at a current density of 2 kA/m², one equipped with an untreated membrane and the other with the pretreated membrane. Employing otherwise identical experimental conditions, the results obtained are shown in Table 1.

EXAMPLE 4

A membrane similar to that of Example 3 was pretreated at 70° C., but under otherwise identical corona conditions. As shown in Table 1, the reduction in cell voltage was of the same order as in Example 3, but in contrast to the results obtained when the pretreatment was carried out at the lower temperature, considerable fluctuation in the specific current consumption occurred in the course of electrolytis. The total service life of the membrane was less by 30%.

EXAMPLE 5

Using two so-called "zero gap cells" i.e. cells in which the electrodes are in direct contact with the membrane, one membrane which had been pretreated at 20° C. was installed in one cell and an untreated membrane in the other. Both electrodes were made up of a plurality of electrically contacted parallel knives or strips each lying with its end face on the membrane. The anode consisted of activated titanium, the cathode of nickel. The following results were obtained, using otherwise the same electrolytic conditions as in Examples 3 and 4:

TABLE 2

| Example | Pretreatment at 20° C. | Cell voltage (Volt) | Current yield (%) | Specific current consumption kWh/t NaOH |
|---|---|---|---|---|
| 5 A | no | 3.10 | 93 | 2.237 |
| 5 B | yes | 2.78 | 92.5 | 2.017 |

It will be understood that the specification and examples are illustrative but not limitative of the present invention and that other embodiments within the spirit and scope of the invention will suggest themselves to those skilled in the art.

What is claimed is:

1. In the treatment of a perfluorinated polymer membrane containing acid ion exchanger groups in a corona discharge, the improvement which comprises employing a membrane containing carboxyl groups and maintaining the membrane at a temperature below about 80° C. during the discharge treatment.

2. A process according to claim 1, wherein the temperature is maintained at about −20° to +50° C. during the discharge treatment.

3. A process according to claim 1, wherein the corona discharge treatment is carried out intermittently.

4. A process according to claim 1, wherein the corona discharge treatment is carried out at an average rate of irradiation below about 5 A/m².

5. A proces according to claim 1, wherein the treatment dose is from about 0.1 to 10 Ah/m² of membrane surface.

6. A process according to claim 1, wherein the frequency of the corona discharge is from about 1 to 60 KHz.

7. A process according to claim 1, wherein the frequency of the corona discharge is from about 1 to 30 kHz.

8. A process according to claim 1, wherein a voltage of from about 1 to 20 kV is used for producing the corona discharge.

9. A process according to claim 1, wherein the temperature is maintained at about − to +22° C. during the treatment the average rate of irradiation is below about 2 A/m², the frequency of the corona discharge is from about 5 to 15 kHz, the voltage for producing the corona discharge is from about 1 to 20 kV and the dose is from about 0.1 to 10 Ah/m² of membrane surface.

10. A process according to claim 9, wherein the discharge is effected in an atmosphere of air or carbon dioxide at substantially atmospheric pressure.

* * * * *

UNITED STATES PATENT AND TRADEMARK OFFICE
CERTIFICATE OF CORRECTION

PATENT NO. : 4,439,292

DATED : March 27, 1984

INVENTOR(S) : Helmut Klotz et al

It is certified that error appears in the above-identified patent and that said Letters Patent is hereby corrected as shown below:

| | |
|---|---|
| Under "U.S. Patent Documents" | 1st line, delete "12/1976" and subtitute --12/1966-- |
| Col. 5, line 63 | Delete "electrolytis" and substitute --electrolysis-- |
| Col. 6, line 56 | After "about -" insert --10-- |

Signed and Sealed this

Twenty-first Day of August 1984

[SEAL]

Attest:

Attesting Officer

GERALD J. MOSSINGHOFF

Commissioner of Patents and Trademarks